Dec. 31, 1963  H. A. ROY, SR  3,115,708
HEIGHT GAGE
Original Filed June 25, 1958　　　　　　　　　　　2 Sheets-Sheet 1
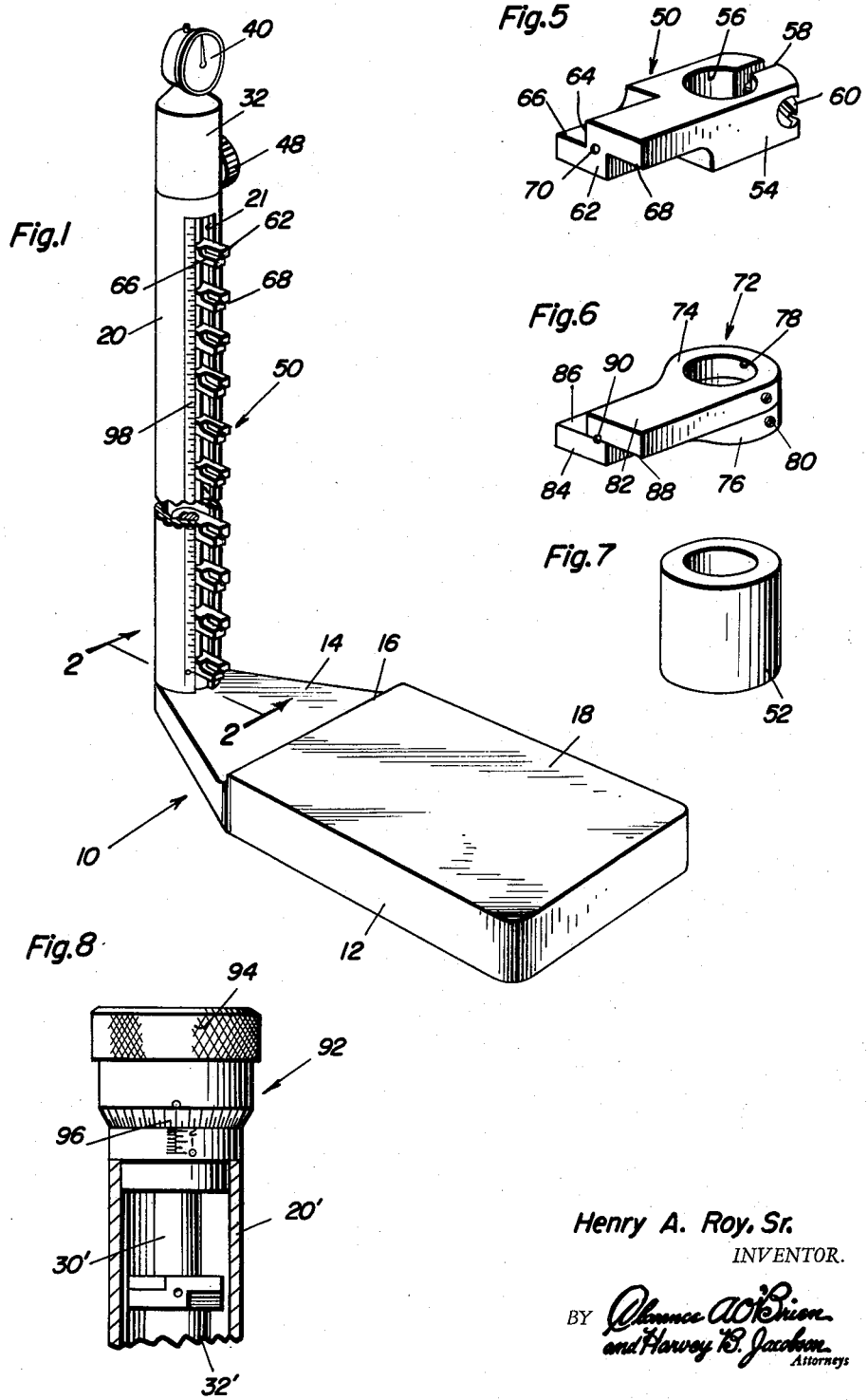
Henry A. Roy, Sr.
INVENTOR.
BY
Attorneys Dec. 31, 1963  H. A. ROY, SR  3,115,708
HEIGHT GAGE
Original Filed June 25, 1958  2 Sheets-Sheet 2
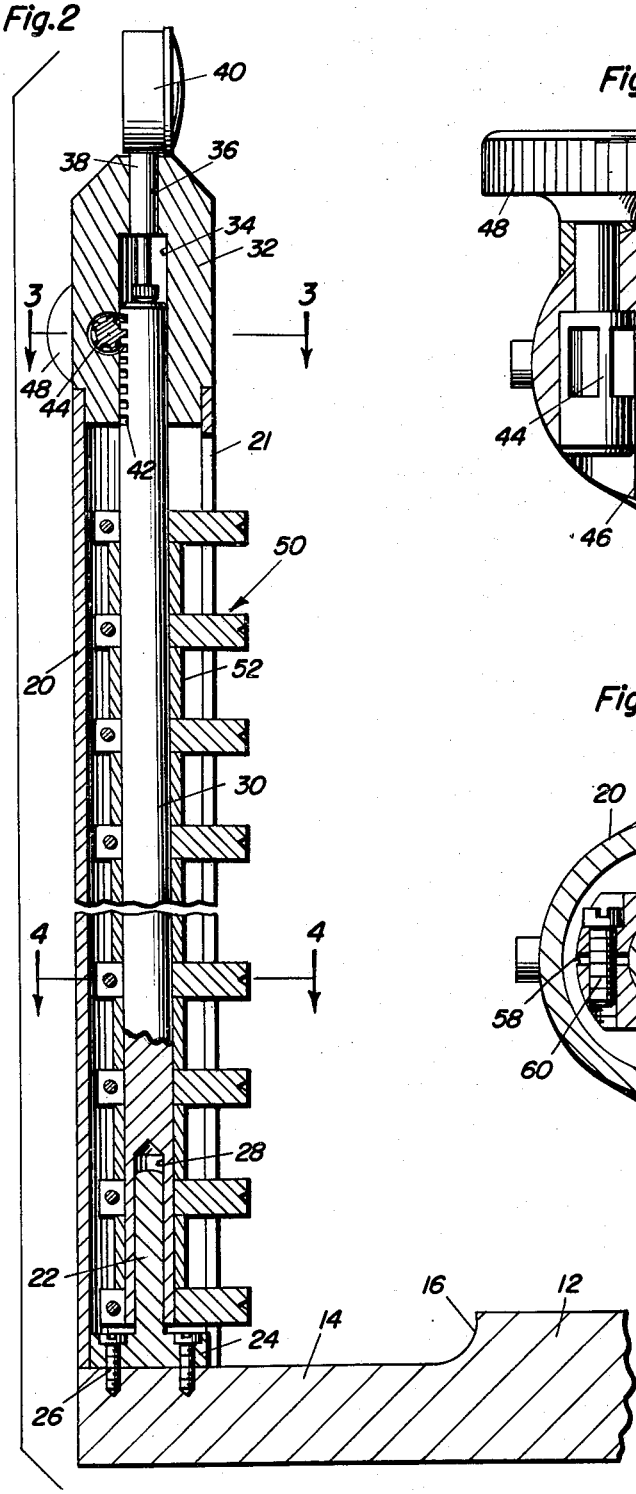
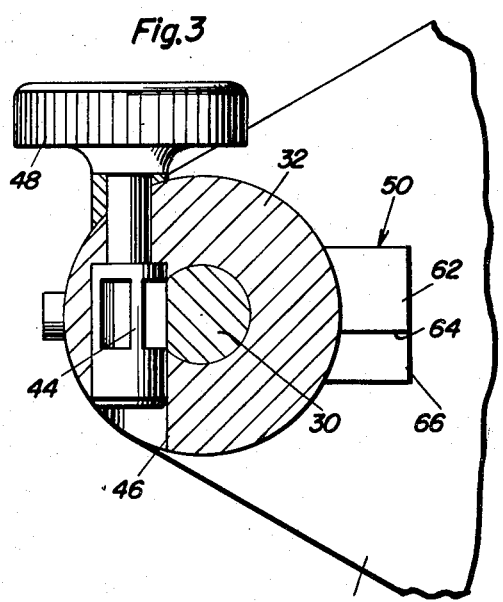
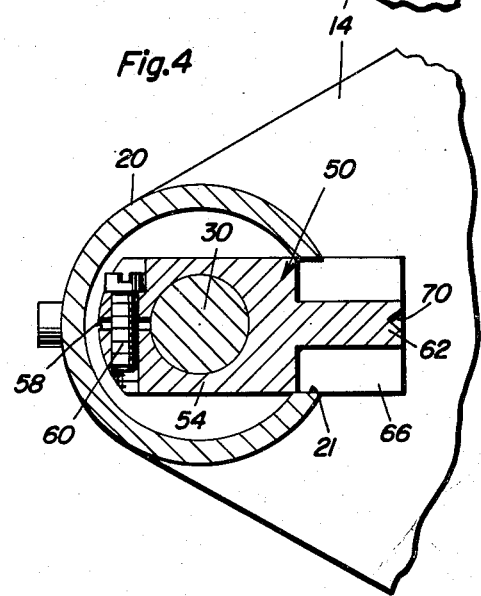
Henry A. Roy, Sr.
INVENTOR.

3,115,708
HEIGHT GAGE
Henry A. Roy, Sr., 117 Lowell St., Peabody, Mass.
Continuation of application Ser. No. 744,366, June 25, 1958. This application May 23, 1962, Ser. No. 203,422
5 Claims. (Cl. 33—143)

The present invention generally relates to a measuring instrument in the form of a height gage for providing a precision basic standard for inspection and manufacturing measurement.

This application is a continuation of application Serial No. 744,366, filed June 25, 1958, for Height Gage, now abandoned.

The primary object of the present invention is to provide a height gage which will repeatedly give precise reading of heights that are transferred from a work piece to the gage or that are taken from the gage and transferred to a work piece.

Another object of the present invention is to take settings from zero and upward, from both the top and undersurface of each gage block without any additional attachments.

A further important feature of the present invention is to provide a structure for accurately setting a layout scriber from zero to any height without any extra attachments.

The present height gage has certain advantages over those previously known in that it can be set, read and used to obtain precise readings while resting on an irregular as well as a flat surface and has an integral surface gaging plate and integral gaging blocks which permit setting of another type gaging instrument to its top or bottom surface without the use of any other attachment. The present gage also is provided with a groove in the ends of the gaging blocks for permitting the setting of a marking or layout scriber precisely and without any additional attachments. Further, this gage can be set by means of a rack and pinion and its setting read from a precision indicator with adjustment being possible from zero to any setting desired and uses a micrometer adjustment or rack and pinion adjustment. This gage also can be transferred from a perfectly flat surface, to an irregular surface, and not affect its accuracy inasmuch as any reading or setting made from a perfectly flat surface on which the gage rests, can be repeated with the same accuracy from any other irregular or distorted surface on which it is placed.

Other important objects of the present invention includes its simplicity of construction, ease of use, accuracy, and relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the height gage of the present invention;

FIGURE 2 is a vertical sectional view taken substantially upon a plane passing along section line 2—2 of FIGURE 1;

FIGURE 3 is a transverse, sectional view taken substantially upon a plane passing along section line 3—3 of FIGURE 2;

FIGURE 4 is a transverse, sectional view taken substantially upon a plane passing along section line 4—4 of FIGURE 2;

FIGURE 5 is a perspective view of one form of gage block;

FIGURE 6 is a perspective view of another form of gage block;

FIGURE 7 is a perspective view of the spacer disposed between adjacent gage blocks; and FIGURE 8 is a partial elevational view with part of the device in section illustrating a micrometer adjustment construction for moving the gage blocks.

Referring now specifically to the drawings, the numeral 10 generally designates the height gage of the present invention which includes a generally rectangular base 12 having an extension 14 at one end thereof of lesser thickness than the base 12 thus defining a recess 16. The base 12 has a precision surface 18 which enables a zero reading in a manner described hereinafter.

Disposed at the outer end of the extension 14 on the base 12 is an elongated tubular member 20 having a longitudinal slot 21 facing the base 12. Disposed within the tubular member 20 is an upstanding guide 22 having an enlarged lower end 24 which rests against the upper surface of the extension 14 and is secured thereto by screw threaded fasteners 26. The upper end of the guide 22 is slidably received in a socket or blind more 28 in an elongated stem 30 which is disposed concentrically within the tubular member 20. The upper end of the tubular member 20 is provided with a fitting 32 having a vertical bore 34 therein slidably receiving the upper end of the stem 30 thereby enabling the stem 30 to move longitudinally within the tubular member 20 by sliding engagement on the guide member 22 and sliding engagement in the bore 34. The upper end of the fitting 32 is provided with a bore 36 of lesser cross-sectional area than the bore 34 for receiving the shank 38 of a dial indicator 40 having contact with the upper end of the stem 30 for registering movement of the stem 30.

The upper end of the stem 30 is also provided with a plurality of longitudinally arranged rack teeth 42 which are in meshing engagement with a pinion gear 44 journaled in a transverse aperture 46 in the fitting 32 and provided with a knurled knob 48 on one end thereof for rotation of the pinion gear 44 for raising and lowering the stem 30 in the tubular member 20.

Secured in accurate longitudinal spaced relation to the stem 30 is a plurality of gage blocks generally designated by the numeral 50 with adjacent gage blocks being disposed in spaced relation by accurate spacers 52 which are cylindrical and closely surround the stem 30.

FIGURE 5 illustrates the details of one form of gage block which is designated by the numeral 50 and includes a body 54 having an aperture 56 extending therethrough and a slit 58 communicating the aperture 56 with the rear side thereof together with a transversely extending clamp screw 60 for urging the edges of the slit 58 together for clamping the body 54 rigidly to the stem. The body 54 is provided with a projection 62 having laterally spaced steps or recesses 64 which define an upper gaging surface 66 and a downwardly facing gage surface 68 with the upwardly facing and downwardly facing surfaces being in the same horizontal plane and thus enabling a reading from over the gaging surface or under the gaging surface. In the same horizontal plane as the gaging surfaces 66 and 68, there is provided an indentation 70 for receiving a scriber for layout purposes which may be employed after the gaging surfaces have been accurately positioned.

FIGURE 6 illustrates a modified form of gage block designated by the numeral 72 which includes two elements 74 and 76 each having an aperture 78 extending therethrough and a setscrew 80 for locking the device in position. Each device 74 and 76 is provided with a projection designated by the numerals 82 and 84 respectively which are disposed against each other but in laterally offset relation for providing an upwardly facing gaging surface 86 and a downwardly facing gaging surface 88 with the line of juncture between the gaging surfaces 86 and 88 being provided with an indentation 90 for receiving a scriber.

FIGURE 8 illustrates a slightly modified form of the invention in which the slotted tubular member 20' has the stem 30' therein which is connected with a micrometer adjustment assembly generally designated by the numeral 92. In this construction, the spindle of the micrometer is connected to the stem 30' and by manipulating the micrometer head thimble 94, the gage blocks may be raised or lowered. The details of the micrometer head assembly 92 are not illustrated but the usual vernier scale arrangement 96 is provided on the thimble and body of the micrometer head.

Each precision measuring block 50 or 72 is lapped on the gaging surfaces and are spaced on one inch centers by the spacers 52. By turning the knurled knob 48 or the thimble 94, the gage blocks 50 or 72 are raised and lowered. The gage blocks protrude sufficiently from the tubular member 20 through the slot 21 for providing adequate working area for ease of use of the device. With the present device, an absolute measurement from the surface on which the gage rests may be provided and a measurement can be taken from a workpiece and determined with the gage. The gage will also permit a predetermined dimension to be set on it and transferred to the workpiece and will give a repeat measurement regardless of the amount of times the indicator is removed from and replaced on the gaging surface. This device provides ease and speed of accurate height measurements from its surface plate and such measurements can be repeated regardless of the surface on which it rests or in other words the gage does not have to be resting on a precision or flat surface. Each gage block permits the measurement or setting of an indicator over a workpiece or under a workpiece without any extra attachments and the recess 16 permits the zero reading to be set by virtue of the first gage block having the gaging surfaces aligned with the surface 18 of the base 12. There is also provided a graduated scale 98 along the slot 21 which shows the position of each gage block in fractions of an inch. This device permits tool makers and model makers to place the gage on their work bench or tool truck without the use of a precision surface plate and enables inspectors and layout men to complete their work in approximately one third of the time now required with other methods being used. Each gage is equipped with its own gaging surface and individual gage blocks may be removed and replaced without destroying the other blocks inasmuch as wearing of the gage blocks elevating and lowering device will not affect the accuracy of the gage block settings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable self-contained height gage comprising a base member having an upwardly exposed gaging surface thereon, an upstanding support rigid with said base member, a slidable stem carried by the support extending upwardly from and slidably mounted in relation to the gaging surface, said base member having a recess in the upper surface thereof and disposed adjacent the gaging surface for receiving the lower end of the support and the stem whereby the lowermost end of the stem is disposed below the plane of the gaging surface, a housing on the upper end of the support, said housing including a longitudinal bore receiving the upper end of the slidable stem, stem engaging means on the support for moving the slidable stem vertically in relation to the gaging surface, indicating means engaging the stem for indicating the movement of the slidable stem, a plurality of gage blocks disposed in spaced relation on the slidable stem, each gage block including a lateral projection extending toward the gaging surface, each gage block having an indentation centrally disposed in the outer surface of the laterally extending projection, each gage block also having a downwardly facing gaging surface and an upwardly facing gaging surface in horizontal alignment formed on the laterally extending projection, said gaging surfaces on the block being parallel with the gaging surface on the base member, the lowermost gage block being mounted on the lowermost end of the stem whereby said gaging surfaces and indentations on the lowermost block are alignable with the gaging surfaces on the base member for establishing a zero reading, said indentation being in alignment with and between the gaging surfaces on the block thereby enabling the gaging surfaces on the blocks on the movable stem to be adjusted in relation to the gaging surface on the base member for enabling the gage to be employed for various uses.

2. The height gage as defined in claim 1 wherein said support includes a tubular sleeve rigidly affixed to the base member, said sleeve including a longitudinal slot facing the gaging surface on the base member, said laterally extending projections on the stem extending laterally outwardly through said slot towards the gaging surface, said housing also including a guide at the lower end thereof engaging the lowermost end of the slidable stem for guiding the stem during the vertical sliding movement thereof, said gage blocks being detachably mounted on the slidable stem, a plurality of spacers disposed between the gage blocks for orientating the gage blocks in spaced relation, said indicating means engaging the upper end of the slidable stem and including a dial for indicating movement of the stem.

3. A portable self-contained height gage comprising a base member having an upwardly exposed gaging surface thereon, an upstanding support rigid with said base member, a movable stem carried by the support extending upwardly from and movably mounted in relation to the gaging surface, said base member having a recess in the upper surface thereof and disposed adjacent the gaging surface for receiving the lower end of the support and the stem whereby the lowermost end of the stem is disposed below the plane of the gaging surface, a housing on the upper end of the support, said housing including a longitudinal bore receiving the upper end of the stem, stem engaging means on the support for moving the stem vertically in relation to the gaging surface, indicating means engaging the stem for indicating the movement of the stem, a plurality of gage blocks disposed in spaced relation on the stem, each gage block including a lateral projection extending laterally toward the gaging surface, each gage block having a downwardly facing gaging surface and an upwardly facing gaging surface in horizontal alignment formed on the laterally extending projection, said gaging surfaces on the block being parallel with the gaging surface on the base member, the lowermost gage block being mounted on the lowermost end of the stem whereby said gaging surfaces on the lowermost block are alignable with the gaging surface on the base member for establishing a zero reading.

4. The height gage as defined in claim 3 wherein said support includes a tubular sleeve rigidly affixed to the base member, said sleeve including a longitudinal slot facing the gaging surface on the base member, said laterally extending projections on the stem extending laterally outwardly through said slot towards the gaging surface, said housing also including a guide at the lower end thereof engaging the lowermost end of the slidable stem for guiding the stem during vertical sliding movement thereof, said gage blocks being detachably mounted on the slidable stem, a plurality of spacers disposed between the gage blocks for orientating the gage blocks in spaced relation, said indicating means engaging the upper end of the slidable stem and including a dial for indicating movement of the stem.

5. A portable self-contained height gage comprising a base member having an upwardly exposed gaging surface thereon, an upstanding support rigid with said base member, a slidable stem carried by the support extending upwardly from and slidably mounted in relation to the gaging surface, said base member having a recess in the upper surface thereof and disposed adjacent the gaging surface for receiving the lower end of the support and the stem whereby the lowermost end of the stem is disposed below the plane of the gaging surface, a housing on the upper end of the support, said housing including a longitudinal bore receiving the upper end of the slidable stem, stem engaging means on the support for moving the slidable stem vertically in relation to the gaging surface, indicating means engaging the stem for indicating the movement of the slidable stem, a plurality of gage blocks disposed in spaced relation on the slidable stem, each gage block including a lateral projection extending toward the gaging surface, each gage block having an indentation centrally disposed in the outer surface of the laterally extending projection, each gage block also having a downwardly facing gaging surface and an upwardly facing gaging surface in horizontal alignment formed on the laterally extending projection, said gaging surfaces on the block being parallel with the gaging surfaces on the base member, the lowermost gage block being mounted on the lowermost end of the stem whereby said gaging surfaces and indentations on the lowermost block are alignable with the gaging surface on the base member for establishing a zero reading, said indentation being in alignment with and between the gaging surfaces on the block thereby enabling the gaging surfaces on the blocks on the movable stem to be adjusted in relation to the gaging surfaces on the base member for enabling the gage to be employed for various uses, said recess in the upper surface of the base having dimensions capable of gaging surfaces and indentations thereon may be aligned with the gaging surface on the base.

References Cited in the file of this patent

UNITED STATES PATENTS

| | | |
|---|---|---|
| 1,575,246 | Anderson | Mar. 2, 1926 |
| 2,135,316 | Whistler et al. | Nov. 1, 1938 |
| 2,429,923 | Cavicchi | Oct. 28, 1947 |
| 2,515,583 | Bennett | July 18, 1950 |
| 2,713,208 | Bizzoco et al. | July 19, 1955 |

FOREIGN PATENTS

| | | |
|---|---|---|
| 394,514 | Great Britain | July 20, 1933 |